Sept. 18, 1945.   H. C. WARNER   2,384,863
DISPENSING AND VENDING SYSTEM
Filed Sept. 24, 1941   2 Sheets-Sheet 1

INVENTOR,
HARRY C. WARNER.
BY Lippincott & Metcalf
ATTORNEYS.

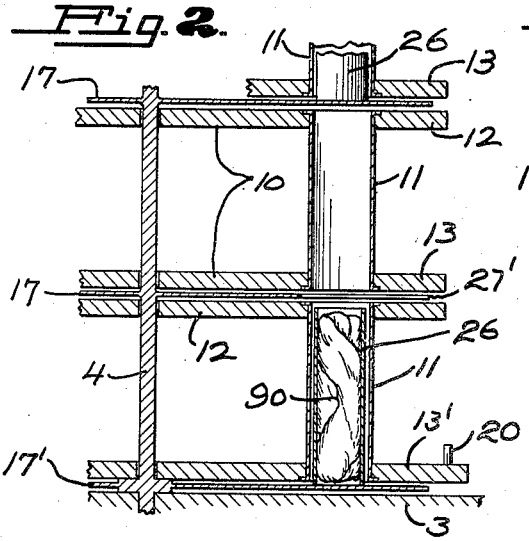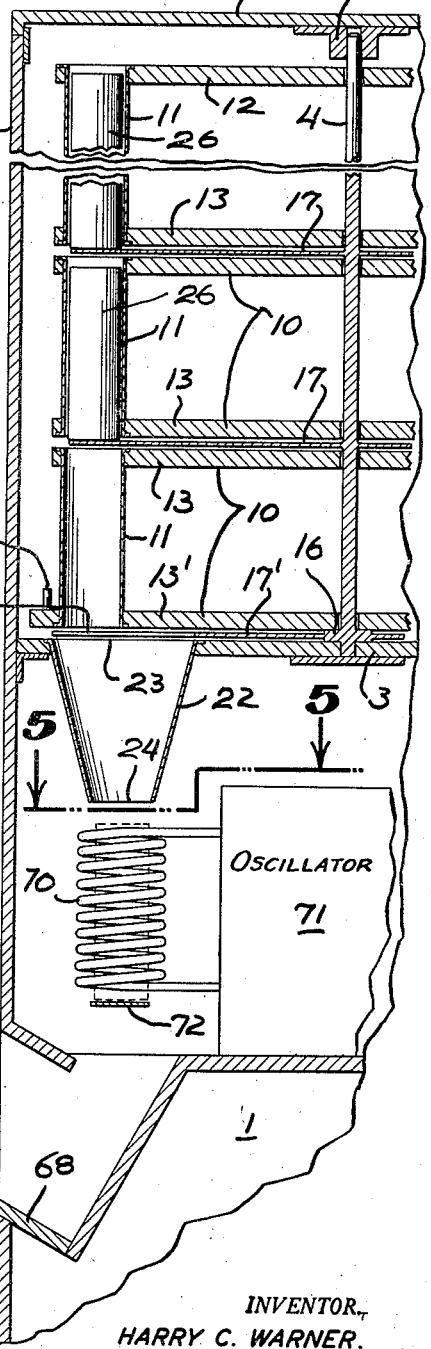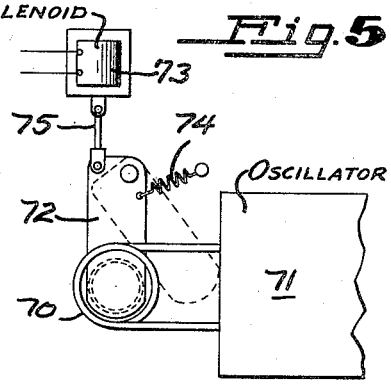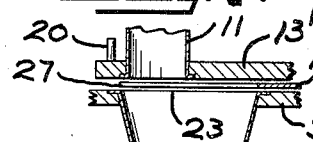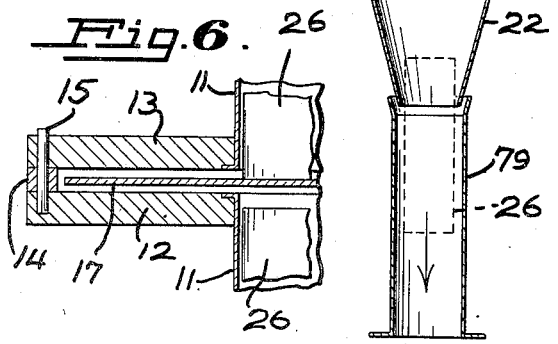

Patented Sept. 18, 1945

2,384,863

UNITED STATES PATENT OFFICE 2,384,863

DISPENSING AND VENDING SYSTEM

Harry C. Warner, San Francisco, Calif., assignor to American Inventions, Inc., San Francisco, Calif., a corporation of California Application September 24, 1941, Serial No. 412,199

4 Claims. (Cl. 99—358)

My invention relates to dispensing and vending systems, and more particularly to coin operated vending systems wherein food and drink, or other articles, may be dispensed and vended under the control of a coin-slide, and wherein such food or drink may be served either hot, cold, or at room temperature to the public.

Among the objects of my invention are: To provide a dispensing and vending system by which food, drink and the like can be served to the public in individual units, and wherein such food, drink or the like may be heated or cooled if desired; to provide a compact dispensing mechanism which can be loaded with a large number of articles to be dispensed; to provide a simple and efficient storage and dispensing mechanism; to provide a dispensing system having a plurality of superimposed tiers of units, each tier feeding a lower tier by gravity; to provide a vending system whereby food, such as for example a sausage assembled in a bun and wrapped, may be fully heated in a relatively short time during the vending cycle of the machine; to provide a means and method of individually heating units of food stored at lower temperatures in a dispensing mechanism; to provide a means of dispensing food or drink in individual containers; to provide a device wherein such containers may be heated as required for consumption by the public; to provide a means of heating wrapped food prepared in individual units; to provide a means for quickly and electrically heating food prior to dispensing said food; to provide a machine suitable for incorporation in a vending cabinet, which with only slight modification can be used to dispense food, drink, or similar materials in units suitable for individual consumption in hot or cold condition; and to provide a vending machine wherein a quantity of individual food units of a size suitable for individual consumption can be stored at room temperature or lower, and wherein said food or drink units may be individually heated during the dispensing cycle.

Fig. 2 is a view, partly in section and partly in elevation, taken as indicated by the line 2—2 in Fig. 1.

Fig. 3 is a view, partly in section and partly in elevation, taken as indicated by the line 3—3 in Fig. 1.

Fig. 5 is a top view in elevation of the mechanism for releasing heated articles.

Fig. 6 is a view, partly in section and partly in elevation, taken as indicated by the line 6—6 in Fig. 1.

Fig. 7 is a partial view of my invention showing the arrangement used for direct discharge of merchandise from the storage stack.

Figure 1:
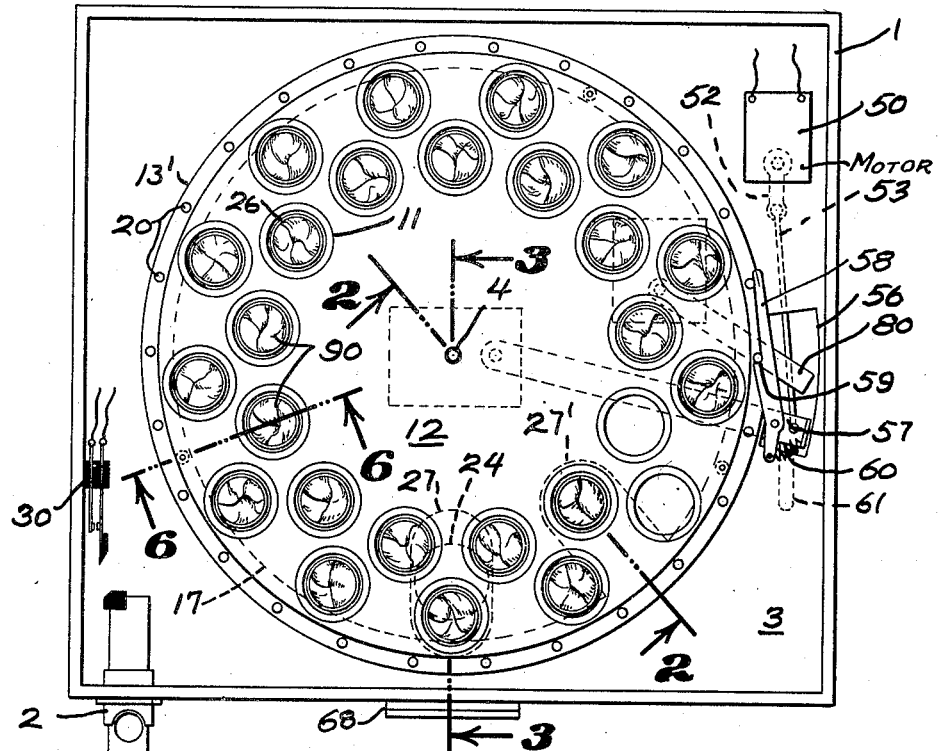
Fig. 1 is a top plan view of one storage stack as installed in a vending cabinet.

Vending machines for handling food and drink products for human consumption in individual units, usually store a plurality of such units in a dispensing mechanism and maintain the units, hot or cold, as a whole. Customarily, food products are maintained in a heated condition in order to be ready for consumption, and drinks in most cases are maintained in the cool state ready for dispensing. In many cases, however, holding food at an elevated temperature for long periods of time deteriorates the food, whereas cooling preserves it, especially when the food is not hermetically enclosed. My invention provides that either food or drink may be stored at room temperature or lower and dispensed directly, or, in the case of food requiring heat and impaired by prolonged exposure thereto, only the unit of food about to be dispensed is heated.

My invention involves preferably the storage of a relatively large number of units of either food or drink in containers of uniform size and shape, made of cardboard, paraffined or otherwise processed to safely and properly hold the food or drink to be dispensed in accordance with food laws of this country. These articles are stored at room temperature, or lower, in a cabinet or similar enclosure if needed, and dispensed one-by-one as called for, and under the control of a coin-switch in case the units are to be vended for pay.

The individual units of food may, if desired, then be passed, during the dispensing cycle, through a heating stage, where they remain a predetermined length of time to be properly heated, thereafter being released for consumption. Heating is preferably accomplished by the application of high-frequency oscillating currents, which reduces the heating time to a minimum.

I prefer to store the individual units to be dispensed in horizontal tiers, one above the other, arranged in such a manner that as one unit is dispensed from a lower tier, a unit from the tier next above is dropped to take the place of a dispensed unit. In this manner a plurality of tiers may be utilized, one above the other, and under these circumstances it will always be the top tier which is first emptied.

My device is, for example, eminently suited for dispensing the type of sandwiches known in the trade as "hot-dogs," wherein a sausage is placed in a cut roll, and wrapped in a napkin, together with condiments for spreading on the sandwich. I readily dispense and heat articles of this sort to edible temperature with my machine, by subjecting the wrapped article to high-frequency currents just prior to discharge from the machines.

As an example of the type of liquids that can be dispensed, I may load the dispenser with containers holding soft drinks of all kinds, fruit juices and other fluids such as milk, which may be directly dispensed and vended at the proper drinking temperature. Soup, in proper containers, can be heated in the same manner as the sandwiches. Candy can be dispensed without heating or cooling.

It will, therefore, be obvious to those skilled in the art that the machine to be described herein may be utilized for handling, dispensing and vending food, drink, or other articles that can be put in containers of uniform shape and bulk.

Broadly as to apparatus, I provide a storage and dispensing mechanism comprising apertured drums stacked one above each other with the apertures passing vertically through the drums. Each of the apertures loosely contains the units to be dispensed, and between each drum is positioned a stationary separating plate which is particularly apertured so that as the entire stack rotates, one and one only unit will drop from each of the storage drums. The article in the lowest drum will be dispensed, while the article from an upper drum will drop into the next lower drum. The apertures in the separating plates are staggered, so that as one unit drops out of the lowermost storage drum a unit from the storage drum next above drops into an aperture of the lower drum previously vacated by a unit. Thus, each storage drum will remain practically full until all the drums above it are empty. The uppermost drum will therefore be emptied first, each succeeding lower drum then being emptied one at a time until the lowermost storage drum is emptied to empty the entire stack. The stack may, of course, be made of as many units one above the other as practical. In this manner, a large storage of units may be accomplished in a relatively compact space.

Means are provided to rotate the entire stack of storage members relative to the separation plates, by an amount in each cycle sufficient to dispense one unit only. In case it is not desired to treat or otherwise change the temperature of the dispensed unit, this unit may be directed by a chute into the hands of the consumer. The rotational movement of the stack may be placed under the control of a coin-slide.

In case the units are to be changed in temperature, the dispensed unit is held in a heating position immediately below the outlet of the dispenser, and preferably means are provided to apply high-frequency electrical oscillations to the unit to heat it by the generation of eddy currents therein. I prefer to use cardboard carriers. Such containers themselves are somewhat conductive and the containers also become heated, although they do not shield the contained food, which is directly heated as well.

The stay in the heating position is preferably under the control of a time-clock. At the end of a predetermined time, means are provided for releasing the food unit from the heating position to fall by gravity into a chute which conveys the heated unit into the hands of the consumer. I prefer that the dispensing and heating mechanism be so arranged that all transfer movements be made by gravity.

I also prefer to dimension the dispenser to utilize a standard size, preferably cylindrical carrier, for all products. In this manner, the same dispensing mechanism may be utilized to vend a large number of different articles. In the case of sausage sandwiches, for example, the bun which has been split and had a sausage laid therein, may be wrapped in a napkin and placed inside the standard cardboard cylinder. Such an arrangement completely compensates for any variation in size of the materials contained in the cylinder. In some cases the food material may be held in the cylinders by friction, and in other cases such as when popcorn is dispensed, for example, the cardboard cylinder may be provided with easily removable ends. In the case of liquids, obviously the cardboard carrier cylinders will be sealed, with tabs or similar devices enabling one end thereof to be opened, and the cylinder then becomes a drinking cup after dispensing has occurred.

Having just broadly described my invention, I will now describe in detail a specific embodiment of my system as adapted for use in dispensing food materials, such as sausage sandwiches wherein each individual sandwich is heated just prior to delivery to the customer, and wherein the remainder of the stored food is held at room temperature, or, if desired, refrigerated.

Referring first to Figs. 1, 2, and 3 for a description of the storage facilities of my invention as used in a vending cabinet, a cabinet 1 is provided with a coin-slide 2 of conventional design. The cabinet 1 is also provided with a horizontal partition 3 on which is mounted an upright rod 4, the upper end of this rod preferably terminating in a positioning fixture 5 on the top cover 6 of the cabinet.

Mounted to rotate freely on rod 4, and stacked one above each other, are a plurality of storage drums 10. Each of these storage drums 10 is provided with staggered rows of vertical tubes 11, joining the top 12 and bottom 13 of each drum. Each drum is substantially identical, so that the tubes from top to bottom of the stack can register. The drums are positioned on rod 4, with the tubes in registry, connected and spaced by pins 15 and spacers 14. The entire drum assembly or stack, may therefore be rotated as a unit on rod 4 with a space between each drum and the next lower drum. The lowest drum is supported on a bearing 16 so that there is also a space provided between partition 3 and the lower disc 13' of the lowest drum. In all of these spaces I position a separation plate 17, this separation plate being fixedly attached at the center thereof to rod 4, so that the separation plates do not rotate, but stand still as the stack of drums is rotated.

Lower disc 13' of the lowermost drum is wider than the discs 12 and 13 of the remainder of the drums, and is provided, adjacent the periphery thereof, with a plurality of ratchet pins 20, these pins being used for the rotation of the stack, as will be described later.

Extending downwardly from partition 3 at the front of cabinet 1 is a discharge funnel 22, the upper aperture 23 of which is of sufficient size radially to register with a tube 11 in either the inner or the outer row of tubes of the lowest drum, whichever may be presented to it. The lower aperture 24 of the funnel 22, however, is substantially circular and of a size comparable to the size of the tube 11 so that when a carrier is discharged from a tube in either the inner row or the outer row of tubes in the lower drum, the carrier discharged will be directed to the same central location.

Plates 17, between each drum, are apertured so that only one unit of merchandise loaded in any of the tubes can be delivered from one drum to another, or from the lowest drum into funnel 22. In order to accommodate transfer of merchandise units in this manner, I prefer to utilize a merchandise carrier 26 in the form, for example, of a cylindrical cardboard tube which will slide readily within tubes 11 and which, when they are positioned within tubes 11, will normally have one end resting upon a plate 17. Under normal circumstances, therefore, the carriers are rotated with the drums supported against the urge of gravity within the drum tubes by a plate 17.

The lowest plate 17' is provided with an elongated aperture 27 of a sufficient size radially to intercept the paths of tubes 11, and the therein contained merchandise carriers 26, in both inner and outer rows. However, the circumferential dimension of this aperture 27 is restricted to the width of one tube 11 to allow the discharge of a single carrier 26 only from a tube 11, depending on exact registration of a front or rear row tube. Thus, carriers will be discharged alternately from the inner and outer rows of tubes. As aperture 27 in plate 17' is registered with the opening 23 in the top of funnel 22, the carrier 26 contained in the registered tube will drop through plate 17' into funnel 22. The next carrier to register is still supported by the plate 17'. Thus, only one carrier at a time can drop out of the lowest drum.

Each of the other plates 17 contain similar apertures 27', but these upper apertures are circumferentially offset between each drum. Thus, as a carrier is unloaded into funnel 22 from the lowest drum, another carrier is dropped into this drum from the drum immediately above, and so on up through the stack. This action occurs irrespective of how many drums are placed one above the other.

Thus, in each drum, using a preferred arcuate offset of apertures 27, and with upper drums loaded, there will only be two empty tubes at any one time, one in each row. The lowest drum is maintained with its full quota of tubes filled, less two, at all times until all of the drums immediately above the lowest drum are empty. Discharge will then continue from the lowest drum only alone until the lowest drum is empty. The offset can, however, be such as to leave only one empty tube.

Filling of the drums may be easily accomplished by loading the top drum only, then rotating the entire stack. The carriers will, during rotation, then be dropped from one drum to another until the lowest drum is full. The word "full" as used herein, means that each drum has its full complement of carriers with the exception of the minimum number of empty spaces which must always be present in each drum.

In order that my device may be utilized as a simple dispenser, wherein any materials desired may be placed in the carrier tubes 26 and directly dispensed, all that is necessary is to provide a means for rotating the stack through a sufficient arc so that one carrier will be discharged into funnel 22. It is obvious that it is possible to rotate the stack by the action of the coin-slide 2 alone, as such coin-slides have a sufficient stroke to move the stack directly through an arc sufficient to discharge a carrier. However, it has been found that customers of vending machines are not particular as to the amount of force, speed or care they use in operating the coin-slide, and I therefore prefer to utilize a motor-driven ratchet mechanism to rotate the stack over the proper arc. This arrangement comprises the use of a coin-switch 30, the contacts of which are momentarily closed by the operation of the coin-slide. The description following will be related to Fig. 4 as showing the electrical circuit used, together with the mechanism as shown on the partition 3 in the other figures.

A motor 50 is mounted on top of partition 3 driving through speed reducing gears not shown, a vertical shaft 51 extending through the partition 3. The end of the shaft 51 below partition 3 is provided with a crank 52 operating a connecting rod 53 which in turn is attached to the end of a lever arm 54 rotatable on a pivot-pin 55 adjacent the insertion of rod 4 in the partition 3. The outer end of arm 54 projects upwardly through an opening 56 in the partition, and carries a block 57 on which is mounted a swinging pawl arm 58 having a notch 59 therein shaped to engage a pin 20 on lower disc 13' of the bottom drum of the stack. Pawl 58 is held against the pins 20 by a pawl-spring 60. Beneath the partition 3, the outer end of arm 54 is provided with an insulating finger 61, which in the resting position of arm 54, engages an upper switch contact 62 and forces this upper switch contact 62 away from a lower switch contact 63. Contacts 62 and 63 are connected in parallel with the contacts of the coin-switch 30. The upper contact 62 of the switch moved by arm 54, is connected directly to one side of A.-C. supply line 64, the current being supplied thereto from A.-C. mains 65 through a main switch 66. The other side of the A.-C. supply is connected by means of connection 67 to motor 50. The other post of motor 50 is connected to lower contact 63 of the arm-operated switch 62—63.

The operation of the electrical system for the dispensing of a single carrier from the stack is as follows: In resting condition, pawl notch 59 engages a pin 20 on the lower disc 13' of the lowest drum. In this condition switch 62—63 is open. The coin-switch 30 is also open. The tube 11 in one row in the lowest drum, registered with aperture 27, has already discharged its carrier. The next carrier 26 to be discharged, in the other row of the lowest drum, is resting on the edge of aperture 27 ready to be discharged. A coin is inserted in switch 2 and the slide pushed in. As the slide is pushed in, switch 30 is closed, thus starting the motor. The motor starts to revolve crank-arm 52, which moves lever-arm 54 and pawl 58 to rotate the stack. At the same time, on the first movement of arm 54, the urge of insulating finger 61 is withdrawn from switch 62—63 and this switch closes. Switch 62—63 is closed before the coin-slide 2 is withdrawn, so that when the slide is withdrawn to open switch 30 the motor will keep on running by current passing through contacts 62—63. The motor then drives crank 52 around one complete revolution, the first half of which advances the stack over a sufficient arc to discharge the waiting carrier through aperture 27. The last half of the revolution of crank 52 resets pawl 58 in readiness for the next cycle.

After the crank 52 has completed one full revolution, the insulated finger 61 again opens switch 62—63 by bearing against the upper contact 62, and the motor stops.

The carrier which is discharged from the stack may slide directly through the cabinet wall to a shelf 68 by means of a cylinder 69, as shown in Fig. 7; or, as will be subsequently described, the carrier with its contents may be subjected to an additional heating operation, as shown in Figs. 1, 4, 5, and 8.

In case the articles contained in carriers 26 are to be dispensed at room temperature, obviously no further apparatus is necessary. If the articles to be dispensed are to be cooled, such as when carriers 26 are filled with a liquid drink, the entire stack may be cooled by refrigeration means placed within the cabinet and the articles discharged directly through cylinder 69. However, if the articles loaded in carriers 26 are to be of a food character where it is desirable that the food be heated, I prefer not to heat the entire stack of articles, because under these conditions food is apt to spoil, to dry out and a large amount of heat is required. I have found that by means of eddy-currents created by the application of a high-frequency alternating field to the individual food carriers, the time of heating can be cut down to a sufficiently low period as to be included within a satisfactory vending cycle. If the food is perishable at room temperature, the entire stack may be cooled to preserve the food in storage. I will therefore next describe the additional apparatus utilized when it is desired to individually heat the carriers and contents.

Under these conditions, I position immediately below lower opening 24 in funnel 22, a high-frequency coil 70 supplied with high-frequency alternating current from an oscillator 71, preferably of the thermionic tube type. Such oscillators are well known in the radio, electrical and therapeutic art. In order that carriers may be held in and discharged from the internal field of coil 70, I provide beneath the coil a swinging gate 72 movable under the control of a solenoid 73. The solenoid is so connected to gate 72 by means of connecting rod 75, that, when the solenoid is energized, gate 72 will be moved to cover the lower end of coil 70, and return to resting position by gate spring 74 when the solenoid is deenergized. Thus, as a carrier drops out of the lowest drum it is guided by funnel 22 into the interior of coil 70, in which the carrier will stay or be discharged therefrom in accordance with the position of gate 72.

Figure 4:
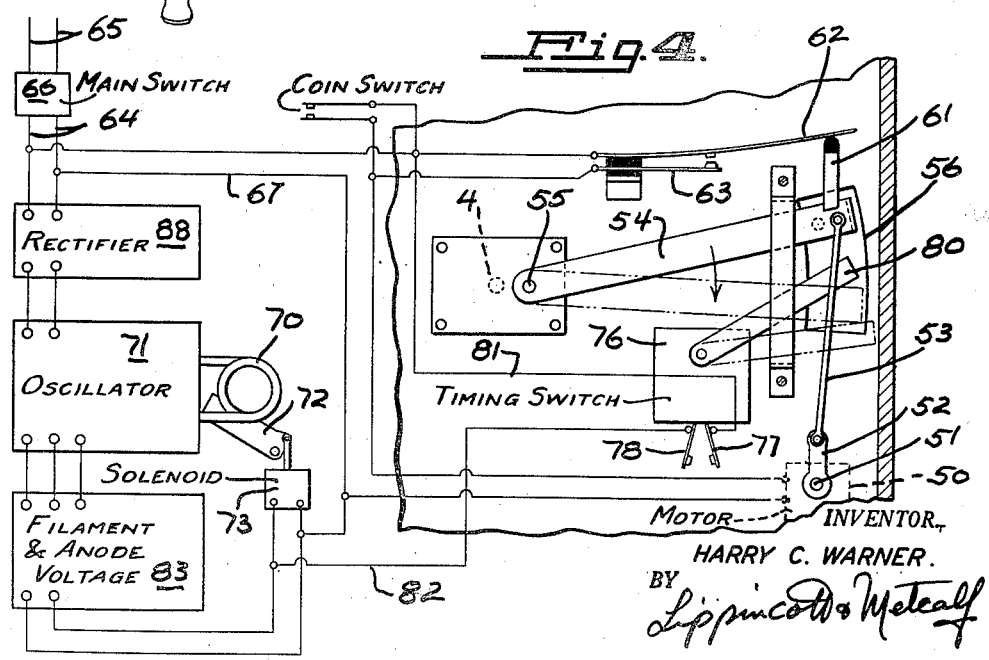
Fig. 4 is a bottom plan view of the mechanism used to advance the storage stack.

In order that the action of oscillator 71 may be properly timed and coordinated with the action of gate 72 and the discharge of the carrier, I provide a timing circuit operating in conjunction with the stack rotating system. This timing circuit comprises a timing switch 76 as shown in Figs. 4 and 8, provided with a pair of switch contacts 77—78. These contacts 77—78 are under the control of switch-arm 80, the outer end of this arm being positioned in the path of rotation of arm 54, to be positively moved thereby in one direction only during the first half of the cycle of movement of arm 54. The arm 80 of the timing switch is coordinated with contacts 77—78, so that when arm 54 is in its normal neutral resting position, arm 80 is resting with contacts 77—78 open. Contact 77 is connected to upper contact 62 of switch 62—63 by connection 81, and contact 78 is connected through an oscillator line 82 to an oscillator filament and anode voltage supply 83 providing filament current and anode for the oscillator tubes in oscillator 71. Line 82 also leads to solenoid 73, the return from which is connected by line 84 to the other side of the filament and anode voltage supply 83, the junction of these two lines being connected by line 85 to the other side of A. C. supply 64. The anode voltage for the oscillator is preferably passed through a rectifier 88, also of the thermionic type; and in order to reduce time-lag in the energization of the oscillator 71, I prefer that the cathodes of the tube or tubes in rectifier 88 be kept heated at all times by a direct cathode connection 90 to the A. C. supply 64.

Timing switch 76 is of the conventional type wherein the first movement of arm 80 closes the contacts 77—78. Further movement of arm 80 winds up a spring within the timing switch. Upon the release of arm 80 by the return of arm 54, arm 80 is returned by the spring action only to its original position, this return being controlled as to time by a governor mechanism. Upon the return of arm 80 of the timing switch to its original position, timing switch contacts 77 and 78 are opened.

When switch contacts 77 and 78 are closed by first movement of arm 80, the filament and anode voltage supply 83 is energized, energizing the oscillator tubes with both filament and anode voltage, the latter being supplied through the rectifier 88. Inasmuch as the cathodes of rectifier 88 are continuously heated, oscillator 71 immediately starts into action, and high-frequency A. C. from this oscillator is delivered to coil 70. At the same time that the filament and anode voltage 83 is energized, solenoid 73 is energized thus swinging the gate 72 to close the bottom of coil 70. Inasmuch as this energization takes place shortly after the first energization of the motor 50, and simultaneously with the beginning of the rotation of the stack, by the time the carrier has been discharged from the stack, the gate 72 is positioned beneath the energized coil and holds the carrier in the coil.

During the stay of the carrier in the coil, whatever is contained in the carrier is subjected to the heating action of the high-frequency currents passing through the coil 70.

As the crank 52 starts the second half of its revolution, and the arm 54 returns to its normal position, it moves away from timing switch-arm 80. The latter returns to its original position in a time that is predetermined by the setting of the governor of the time-switch. As the timing switch arm 80 returns to its original position, contacts 77 and 80 are opened, the filament and anode voltage supply to the oscillator is cut off, thus shutting off the high-frequency. The gate 72 is pulled away from below the coil by gate spring 74 and the heated carrier with its contained sandwich drops to the shelf 68 so that it will be available to the customer.

I have found, for example, that when sandwiches 90 are contained in the carrier, such as, for example, a bun which has been slit and had a sausage positioned within the slit, this bun being wrapped and forced into the carrier 26, a 15-second application of the high-frequency current to the sandwich is sufficient to heat the sandwich to a proper temperature for consumption.

Thus, the entire vending cycle is limited only by the amount of time necessary to heat the material in the carriers 26. As stated above, I have found that a 15-second application of the high-frequency current is sufficient to bring the wrapped food up to a desired edible temperature.

From the above description it will be seen that

I have provided a simple storage and dispensing mechanism comprising a plurality of storage drums stacked one above the other in such a manner that articles to be vended or dispensed are discharged only from the lowest unit, this lowest unit being kept substantially full at all times from upper units until the uppermost unit is emptied, whereupon the succeeding lower units become empty. Articles when so stored may be maintained at room or lower temperatures and individually discharged directly from the stack under the control of the coin-switch, if desired. If it is desired that the articles be dispensed in heated condition, then the article is dispensed into a heating stage, where, for a short length of time, a predetermined part of the vending cycle, the article is heated by the action of a high-frequency field, even though it may be completely wrapped. After a certain definite time has elapsed, the heating current is shut off and the heated article automatically passed out of the device for use.

Obviously, therefore, my device may be utilized for the dispensing or vending of practically any and all articles which are capable of being enclosed and supported by carriers of uniform size and shape under conditions of heat, cold, or room temperature, and under control of a coin-switch if desired.

It should be pointed out that one of the main advantages of my invention is that highly perishable food can be dispensed in heated condition by the machine as above described, by cooling the entire stack to a proper storage temperature, and then slightly lengthening the time of exposure of the carrier to the high-frequency heating system to compensate for the lower temperature of the carriers discharged into the heating system.

I claim:

1. In a storage machine for individually dispensing a uniformly packaged food item, a plurality of holders for individually packaged food items, a discharge chute, means for serially discharging said items along a predetermined path to said discharge chute, an electrically conductive coil disposed with its longitudinal axis along said path, said coil being of a diameter sufficient to permit passage of one of such items therethrough at a time, means for developing high frequency electrical energy in said coil, and means for blocking movement of such item within said coil, said blocking means being held in blocking position during energization of said coil while heating the food.

2. In a storage machine for individually dispensing a uniformly packaged food item, a plurality of holders for individually packaged food items, a discharge chute, means for serially discharging said items along a predetermined path to said discharge chute, an electrically conductive coil disposed with its longitudinal axis along said path, said coil being of a diameter sufficient to permit passage of one of such items therethrough at a time, means for developing high frequency electrical energy in said coil, a gate swingably mounted to block the exit end of said coil in one position of said gate, and means for swinging said gate to said blocking position during energization of said high frequency electrical energy generating means while heating the food.

3. In a storage machine for individually dispensing a uniformly packaged food item, a plurality of holders for individually packaged food items, a discharge chute, means for serially discharging said items along a predetermined path to said discharge chute, said means including a wide mouthed funnel disposed in said path with its wide mouthed end toward said holders, an electrically conductive coil disposed adjacent the discharge end of said funnel and with its longitudinal axis along said path, said coil being of a diameter sufficient to permit passage of one of such items therethrough at a time, means for developing high frequency electrical energy in said coil, and means for blocking movement of such item within said coil, said blocking means being held in blocking position during energization of said coil while heating the food.

4. In a storage machine for individually dispensing a uniformly packaged food item, a plurality of holders for individually packaged food items, a discharge chute, means for serially discharging said items along a predetermined path to said discharge chute, said means including a funnel disposed in said path with its wide end toward said holders, electrical induction heating means receiving said items and disposed alongside the predetermined path of travel of such items beyond the discharge end of said funnel, means for developing high frequency electrical energy in said electrical induction heating means, and means for blocking movement of such item within said heating means, said blocking means being held in blocking position during energization of said heating means while heating the food.

HARRY C. WARNER.